United States Patent Office 2,995,455
Patented Aug. 8, 1961

2,995,455
METHOD OF RECOVERING NICKEL AND IRON FROM LATERITE ORES BY PREFERENTIAL REDUCTION
Michio Uemura, Anjo, Japan, assignor to Tohoku Denki Seitetsu Kabushiki Kaisha, Tokyo, Japan, a corporation of Japan
No Drawing. Filed June 25, 1958, Ser. No. 744,355
2 Claims. (Cl. 106—103)

The present invention relates to a method for the recovery of iron and nickel from laterite ore.

The principal object of this invention is to provide higher grade pig iron or raw steel, of low phosphorous, low sulphur and low copper from the laterite ore deposited inexhaustibly in the Philippines, Cuba and other tropical districts on earth, which has not yet been exploited nor utilized industrially; to provide the separation and recovery of nickel and chromium, by-components, with the residual slag being recovered in the form of alumina cement. Thus, the entire components of laterite ore are contemplated to be effectively and industrially utilized.

Other objects, features and advantages of this invention will be apparent from the following descriptions.

In general the laterite ore contains around 50% of iron as its principal component, with about 1% of nickel and about 2% of chromium as by-components, and has around 8% of alumina and around 2% of silica as impurities together with around 10% of mixed water and around 12% of combined water and constitutes an earthy or powdered weathered ore.

The composition of this laterite ore varies depending on the deposited region, but is generally as follows (in the dry state):

| | Percent |
|---|---|
| Fe | 47.0 –54.0 |
| Cr | 1.0 – 2.9 |
| Ni | 0.12– 1.3 |
| P | 0.01– 0.08 |
| S | 0.25– 0.42 |
| MnO | 0.3 – 2.3 |
| $SiO_2$ | 1.3 – 5.0 |
| $Al_2O_3$ | 6.0 –11.0 |
| CaO | 0.6 – 1.0 |
| MgO | 0.2 – 0.87 |
| $H_2O$ (combined) | 11.0 –13.67 |

Further, $H_2O$ (mixed) of this particular ore is 3.0–11.0%.

In case where the aforesaid ore is submitted to the smelting to make pig iron, the majority of the nickel and chromium contained therein will be reduced together with iron and enter in the pig iron reduced. It is well-known that it is relatively easy to remove chromium from nickel-chromium-bearing pig iron, while it is almost impossible to remove nickel therefrom. Pig iron containing nickel may be applied for effective use wherein its characteristics can be utilized. However, for a wider application of such a pig iron, it is desirous to obtain pig iron low in nickel. For this purpose, there is a need to remove the nickel before hand from the laterite ore by pretreating said ore, prir to its smelting.

As a means for removing nickel from low nickel ores various methods have been proposed such as a wet and a dry method. However, these methods, though possible technically, have not been successful industrially on account of the production cost being considerably high and not economical.

Particularly, this is the case with low nickel ores such as those of a nickel content below 1%. Some years ago, a method for removing nickel from iron ore was invention in Japan (Japanese Patent No. 206,710). According to this method, laterite ore is first added with water in an amount of 10 to 30% and then submitted to the so-called preferential reduction in an electric furnace without adding any other substances, namely the reduction may be carried out in an electric furnace, with carbonaceous reducing agent being limited to an amount just required for obtaining ferro-nickel from nickel contained in the ore, thereby the nickel content of the ore is separated in the form of ferro-nickel. The disadvantage of this method resides, however, in that this method may be effectively carried into practice in an electric furnace of small capacity, but is not adapted for a large scale industrial production. Namely, in this method a bumping phenomenon is caused to occur in the furnace contents by generated gases with an object of accelerating the reaction under stirring and simultaneously the agglomeration of ferro-nickel particles is intended. Even though the bumping phenomenon will not be dangerous in the case where the electric furnace is of a small size, the said bumping will become very dangerous in a large size electric furnace, i.e., it would sometimes become a cause for operator's death and wounds or other unexpected damages. Consequently, in this method a large scale production can not be carried into practice.

This inventor has now created a preferential reducing method fitting for a large scale production, by improving the above-mentioned method. Namely, according to the present invention, the said laterite ore is mixed with about 2.0 to 3.0% by weight of flux, such as quick lime or limestone and about 1% by weight of sodium chloride or other alkali halide (industrially common salt is the cheapest), without the addition of water and further admixed with a carbonaceous reducing agent such as powdered charcoal or coke in such an amount that the nickel content of the ore may become ferro-nickel, the mixture being then melted in an electric furnace at a temperature of 1450 to 1550° C. to recover the nickel in the ore as ferro-nickel. Since in the process of this invention no water is added, the quantity of generating gas will be slight and no bumping phenomenon will take place, even in the operation of a large electric furnace. Moreover, the presence of alkali halide improves by far the electrical conductivity as compared with the case of water alone. In the case of water alone the starting passage of an electric current is especially hard at the beginning of the operation, while in the case of alkali halides being added (particularly, the presence of a slight amount of mixed water in the ore is further effective) the starting current can be easily passed. Further, as another effect of the addition of alkali halide, a part of the alkali halide lowers the melting point of the ore in cooperation with the quick lime or limestone being added as a flux and promotes its melting, and consequently lowers the viscosity of molten ore. Thus, the presence of the alkali halide is extremely useful in the separation, setting and agglomeration of resulting ferro-nickel particles. Moreover, the added alkali halide gradually escapes in a vapor form with the rise of temperature. The vaporization thereof is considered to contribute to the separation, setting and agglomeration of the produced ferro-nickel particles. On the contrary, in the preferential reduction according to the usual known method, the separation, setting and agglomeration of ferro-nickel particles are remarkably difficult and the yield of ferro-nickel to be produced is not as high as expected. As shown in the example referred to later, according to the method of the present invention the separation, setting and agglomeration of ferro-nickel particles produced is effected smoothly and easily contrary to expectation. The recovery of nickel reaches over 90%. This results from the lubricant like action of alkali halide vapor, in addition to the lowering of the melting point of the ore due to the admixture of alkali halides. As the separation and setting of ferro-nickel in the furnace bottom is extraordinarily easy, the produced ferro-nickel is separated from the melted ore residue by tapping, as in the usual smelting practice of electric furnace, and then the ferro-nickel can be gradually tapped from the furnace bottom. Thus, according to the present method, ferro-nickel is easily obtained continuously in an industrial scale. Thus, in the method of this invention, ferro-nickel (nickel content 23%) can be obtained with a yield of over 90% from the laterite ore containing nickel in the order of 0.7%, as will be described later.

Since the added alkali halide evaporates almost entirely, no alkali halide exists in the melted ore residue remaining after the nickel content has been separated and recovered. This is most important for the utilization of melted ore residue. Namely, as described later, when pig iron containing chromium is produced by smelting from raw material, melted ore residue of the laterite ore remaining after the nickel content thereof has been separated, measures are taken in such that the slag making pig iron is wholly recovered as alumina cement. If alkali halide should remain in the said melted slag, the alkali halide enters into the alumina cement and deteriorates the quality of the cement. However, fortunately, as the alkali halide evaporates almost entirely, the properties of the alumina cement obtained are not deteriorated.

Pretreatments of earthy or powdered laterite ore, such as briquetting, sintering or pelletizing of ores, are inevitably needed to make the raw ores lumpy, in order to carry out a large scale smelting of iron ore directly from raw material. When such a raw ore is submitted to the preferential reduction of nickel according to the present invention as a pretreating process, the nickel content of the ore can be almost entirely recovered in a simple manner in the form of ferro-nickel and on the other hand, the residue can be readily crushed to lump ores suitable for the smelting; therefore, the preferential reduction of nickel according to the present invention is a method by which two objects can be accomplished in one operation. Moreover, with the fused residue, the combined water in the raw laterite ore can be removed simultaneously with the mixed water and completely dried. Therefore, the iron content of the fused residue is increased over that of a raw ore, and the fused residue is in a more reducible state.

The foregoing description has been made about the removal of nickel with respect to the laterite ore. The method of recovering nickel according to the present invention can be applied to other low nickel ore than the laterite ores.

Now, the process of smelting ore according to this invention, by using the melted ore residue remaining after recovering nickel in the laterite ore in the form of ferro-nickel is described as follows:

The reason why laterite ore has not been heretofore used alone as raw material for the manufacture of iron is that the ore is of high alumina and low silica content. As the laterite ore is high in alumina, the slag resulting from the smelting is sparingly fusible; and it is, therefore, necessary to lower the alumina content of the formed slag less than 23% by the addition of silica sand or iron ore rich in $SiO_2$, in order to form the fluid slag. However, by adding these materials, the amount of the slag thus formed becomes abundant and the fuel or electric power necessary for melting the slag increases a great deal which is remarkably disadvantageous economically.

The characteristics of high alumina and high silica content of the laterite ore are reversely put to practical use in the present invention. The slag is not made by a $CaO-SiO_2$ system as in the case of the usual practice, but by an $Al_2O_3-CaO$ system, and thereby an economical smelting has been successfully accomplished. Namely, the reduction is effected by adding to the melted ore residue remaining after the nickel content having been separated from the laterite ore 15 to 30% by weight of flux, for example, limestone and 10 to 30% by weight of an agent high in alumina, such as bauxite. The amounts to be added of said limestone and high alumina material are so chosen that the slag ratio becomes above 0.5 and the composition thereof becomes appropriate for alumina cement, that is, the composition of slag becomes that of which $Al_2O_3$ is around 50% and CaO around 40%. Thereby, the fluidity of this slag becomes satisfactory, and the slag turns wholly into the alumina cement. The smelting operation is very smooth and economical.

In the conventional smelting of iron ore, the amount of slag ranges generally from 200 to 350 kilograms per ton of pig iron (i.e. slag ratio: 0.2–0.35). In carrying out the present invention, however, such slag ratio as described above accompanies various disadvantages in the practical operation. I have executed numerous experiments and studies and have come to the conclusion that the slag ratio is required to be higher than 0.5 in order to carry out the process according to the present invention effectively. The reason for this lies in that the slag serves to prevent the oxidation of molten pig iron or to avoid the absorption of gas by the said molten metal and particularly it is most important to impart sufficient fluidity to the molten pig iron by holding the said pig iron at high temperatures and to make the smelting reaction between the molten pig iron and slag proceed effectively.

In general, in the manufacture of pig iron in an electric furnace, the slag ratio of 0.3 to 0.5 is regarded as preferable. This is, however, chiefly the case with the slag of the $CaO-SiO_2$ system. In the case of the slag of the $Al_2O_3-CaO$ system as in the present invention, the operation will be disturbed unless the slag ratio is above 0.5 as described before. The reason for this is as follows: For instance, in comparing the $CaO-SiO_2$ system slag with the $Al_2O_3-CaO$ system slag with respect to the electric conductivity at 1500° C., the former shows the specific electric conductivity of 0.1 to $0.3\Omega^{-1}$ cm.$^{-1}$, while the latter shows 0.3 to $0.9\Omega^{-1}$ cm.$^{-1}$. That is, the latter, $Al_2O_3-CaO$ system slag has approx. 3 times greater electric conductivity than that of the former. Accordingly, substantially equal electric conductivity may be shown when the slag amounts to about 3 times that of the smelting with $CaO-SiO_2$ system slag. In the electric furnace practice for making pig iron, the slag not only participates in the reaction, but it also constitutes a resistant heat generator. Therefore, the electric resistance thereof has an important relationship with the condition of the furnace. The balanced electric current and the furnace temperature are maintained by an adequate amount of slag, whereby a smooth operation of the furnace is obtained.

As described above, when high alumina material and limestone are further added, the electric power for the heat source required for the smelting will increase to some extent. Thus, however, stable furnace conditions are maintained and the efficiency of electric current is increased, and as a result the economical loss in the electric power is compensated and the substance added can all be converted to high price alumina cement, thus providing an extremely advantageous economical operation. Moreover, as the iron component in the bauxite converts to pig iron, this is also of advantage.

In an electric furnace practice where no high alumina material, e.g. bauxite, is added the position of the electrode tip portion is often unstable due to an extremely small amount of slag formation resulting in a large instantaneous excess current being generated. When the electrode is raised in order to prevent this instantaneous passage of an excess current, the electrode tip portion enters immediately into the unmelted raw material layer and the electric current decreases rapidly. Thus, the electric current distribution becomes non-uniform and a local heating and other unstable phenomena are liable to occur.

The utilization of this slag is described as follows.

The composition of the slag is approximately 50% of $Al_2O_3$, 40% of CaO, 6% of $SiO_2$, 5% of FeO and 4% of others. The melting point of said slag is 1250 to 1350° C. This composition is adequate for alumina cement of ultra high early strength. Limit of the silica content of the alumina cement is below approx. 11%, and if the silica content is beyond this limit the properties of the cement become remarkably deteriorated. Fortunately, the silica content of the laterite ore being lower, the silica in the slag is always far below said limit. The impurities in the order of 5% of FeO and 5% of others will not deteriorate the properties of cement. CaS, $CaC_2$, AlN and the like, which exist always in small quantities in the cement, generate hydrogen sulfide, acetylene or ammonia gas after hardening of alumina cement and deteriorates the properties of the hardened material. Further, FeO is also oxidized in the coagulated cement and cause the hardened product to disintegrate.

Consequently, in the present invention, the molten slag flowing out of the furnace at a temperature of 1300 to 1400° C. is required to be blown with compressed air, preferably under a pressure of about 4 kg./cm.$^2$ of approx. 2 to 3 cubic meters at N.T.P. for one minute per ton of slag, for 5 to 10 minutes to oxidize the slight amount of impurities and FeO as mentioned before. The slag is then cooled and solidified after the oxygen blowing. It is advantageous, however, to first hold its temperature from 1000 to 700° C. for approx. one hour without rapidly cooling the said slag. It has been found by experiments, that when the temperature of the slag formed is retained as mentioned above, the hydraulicity of cement can be further improved. Thereafter, the cement is cooled naturally and pulverized to produce alumina cement.

The operations of desulfurization, dephosphorization and dechromization of chromium containing pig iron by the above process is as follows:

If the pig iron includes chromium of more than 0.20%, various difficulties will occur in the course of its refining. Namely, chromium is oxidized during the refining of said pig iron to chromite or chrome spinel, either of which has a high melting point and can not be easily separated from the metal bath. Hence, the common process for making steel from chromium-containing pig iron can only produce low grade metal deteriorated by chromium oxide. When chromium remains in the steel, the workability of the steel will be remarkably reduced. In order to refine the aforesaid molten pig iron it is first placed in a rotary drum furnace and then subjected to desulfurization at 1400 to 1450° C. under agitation by rotating after quick lime is added thereto in a well-known process, thus the desulfurization is continued until the sulphur content in the pig iron is below 0.02%. After slagging off, the dephosphorization and dechromization are simultaneously carried out in the same furnace at a temperature of 1300 to 1380° C. Pure oxygen gas is effectively used as an oxidizing agent (some powdered iron ore may also be used in the reaction for a temperature control) and a basic operation is adopted with especially high basicity such as 2.5 to 3.5 and with the addition of approx. 10% by weight of fluorite (or fluorspar) as a flux. The necessary time for this oxygen blowing is about 10 minutes. After slagging off, a refined steel containing only about .005% P, 0.10% Cr and 1.5% C is obtained.

The composition of the slag after the above-mentioned desulfurization and dechromization is substantially as below:

$SiO_2$, 16%; CaO, 40%; FeO, 30%, and $Cr_2O_3$, 11 to 15%

The iron loss from the pig iron to the slag is in the order of 10%. This slag can be utilized by a well-known process as an addition agent to be used in the manufacture of high carbon ferro-chromium from ordinary chromium ore.

This invention is further described in the following example, which serves to illustrate the method according to the present invention.

*Example*

The laterite ore used in this example was produced at Samar, in the Philippines and (mixed water was eliminated by drying) has the following composition:

[In percent]

| Fe | Cr | Ni | Mn | Cu | P | S | $Al_2O_3$ | Mg | CaO | $SiO_2$ | combined water |
|---|---|---|---|---|---|---|---|---|---|---|---|
| 53.0 | 1.82 | 0.76 | 0.81 | 0.003 | 0.05 | 0.12 | 8.53 | 0.81 | 0.62 | 2.67 | 8.0 |

The dried laterite ore including 3% of mixed water was pulverized to about 100 Tyler mesh, and 25 kg. of quick lime, 10 kg. of common salt (sodium chloride) and 65 kg. of charcoal powder for each 1000 kg. of the ore were mixed with the ore. The mixture was charged in a 250 kva. 3-phase electric furnace of Héroult type and the preferential reduction was performed at about 1500° C. The electric furnace employed was lined with electrically fused cast complex spinel refractory bricks. In the continuous operation, the ferro-nickel was fused and collected at the bottom of the furnace and was easily separated from the melted ore residue.

Ferro-nickel thus obtained contains 23% of Ni. The composition of the impurities contained in this ferro-nickel is as follows:

[In percent]

| C | Si | Mn | P | S | Cr |
|---|---|---|---|---|---|
| 0.03 | 0.02 | trace | 0.02 | 0.06 | 0.01 |

The composition of the melted ore residue is as follows:

[In percent]

| Fe | Ni | Cr | CaO | $SiO_2$ | $Al_2O_3$ | $Na_2O$ |
|---|---|---|---|---|---|---|
| 55.3 | 0.06 | 1.92 | 3.05 | 2.82 | 9.05 | 0.04 |

The yield of nickel was 92%; 29 kg. of the above-mentioned ferro-nickel and 910 kg. of the melted ore residue were obtained per 1000 kg. of ore.

Subsequently, the pig iron made from the above-mentioned melted ore residue as raw material was carried out in another 250 kva. three phase electric furnace of the Héroult type. The smelting of iron ore was carried out at about 1500° C. with the admixing of 340 kg. of limestone, 250 kg. of bauxite and 500 kg. of coke per 1600 kg. of the melted ore residue. 1000 kg. of pig iron containing chromium and 600 kg. of slag were obtained.

The slag ratio in this case was 0.6 and the operation proceeded smoothly. The mean tapping temperature was 1450° C.

The composition of the used bauxite, the obtained pig iron and the slag are as below:

BAUXITE
[In percent]

| Fe | Cr | P | S | SiO$_2$ | Al$_2$O$_3$ | CaO |
|---|---|---|---|---|---|---|
| 19.8 | 0.06 | 0.04 | 0.49 | 4.48 | 61.8 | 0.92 |

PIG IRON
[In percent]

| C | Si | Mn | Ni | Cr | P | S |
|---|---|---|---|---|---|---|
| 4.31 | 0.37 | 0.92 | 0.09 | 2.95 | 0.16 | 0.13 |

SLAG
[In percent]

| Al$_2$O$_3$ | CaO | SiO$_2$ | MgO | FeO |
|---|---|---|---|---|
| 50.4 | 41.2 | 5.21 | 1.92 | 2.02 |

The above-cited slag can be utilized as alumina cement. Compressed air of 4 kg./cm.$^2$ was blown over the melted slag for 10 min. at a rate of 2.5 cubic meters at N.T.P. per minute per ton of slag in order to oxidize impurities such as CaS, CaC$_2$, AlN and the like, and FeO as well. Thereafter the slag was held in a temperature ranging from 1000 to 700° C. for one hour, and subsequently cooled naturally and finally pulverized by the ordinary method to obtain an excellent alumina cement. The compressive strength and the bending strength provided by the concreting test of this cement are as follows:

| After days | 1 day | 3 days | 7 days | 28 days |
|---|---|---|---|---|
| Compressive strength (Kg./cm.$^2$) | 180 | 320 | 450 | 480 |
| Bending strength (Kg./cm.$^2$) | 28 | 48 | 50 | 63 |

Thereafter, the refining of this chromium containing pig iron was carried out. For refining, a test rotary drum furnace was used, of which the inner dimensions are 70 cm. φ x 120 cm., the wall thickness being 30 cm., and the inner wall being lined with double burnt dolomite bricks. The revolution number was 13 to 38 r.p.m. and the power of 10 H.P. was used. Further, this furnace was provided with a heating device by an oil burner and an oxygen blowing device. The furnace was designed to be tilted to discharge its content.

First, the rotary drum furnace was preheated by the oil burner up to 1450° C., in which furnace 450 kg. of the above-mentioned molten pig iron and 10 kg. of quick lime powder were charged. After closing the furnace it was heated to 1450 to 1400° C. for 20 minutes under the revolution of 38 r.p.m. to desulfurize the said pig iron.

The composition of the heated pig iron was found as below:

[In percent]

| C | Si | Mn | Ni | Cr | P | S |
|---|---|---|---|---|---|---|
| 4.27 | 0.26 | 0.90 | 0.09 | 2.95 | 0.16 | 0.02 |

The slag formed in the desulfurization treatment was discharged from the furnace and immediately the dephosphorization and dechromization were commenced simultaneously. Namely, the molten pig iron in the rotary drum furnace was admixed with 20 kg. of quick lime, 5 kg. of silica and 3 kg. of fluorspar, then the furnace was revolved at 13 r.p.m., and pure oxygen gas under a pressure of 6 kg./cm.$^2$ was blown vigorously in the slag through water-cooled nozzles at the rate of about 0.9 cubic meters at N.T.P. per ton of pig iron, and at a temperature of 1300 to 1400° C. for 8 minutes. The slag formed was discharged and then the slagging-off was similarly conducted two further times by recharging with fresh slag forming material and blowing the oxygen for 8 minutes in each instance. Thereupon, slagging-off and pig iron tapping were performed. The amount of oxygen being used was about 7 cubic meters at N.T.P. in each blowing. Thus the amount of the obtained pig iron was about 380 kg.; the total slag formed amounted to about 120 kg. The compositions of the pig iron and slag were as follows:

PIG IRON
[In percent]

| C | Si | Mn | Ni | Cr | P | S |
|---|---|---|---|---|---|---|
| 1.19 | 0.06 | 0.07 | 0.10 | 0.11 | 0.006 | 0.025 |

SLAG (AVERAGE FOR 3 TIMES)
[In percent]

| SiO$_2$ | CaO | FeO | Cr$_2$O$_3$ | CaO / SiO$_2$ |
|---|---|---|---|---|
| 13.4 | 40.3 | 32.3 | 13.3 | 3.0 |

What I claim is:

1. In the recovery of nickel and iron from laterite ore by preferential reduction by smelting the laterite ore, admixed with an alkali metal halid, a flux and a carbonaceous reducing material, a method of manufacturing alumina cement from molten slag of the melted ore residue, which comprises the steps of blowing compressed air of 2 to 3 cubic meter at N.T.P. per minute per ton of slag on the surface of molten slag at 1300 to 1400° C. formed in the smelting of iron from the melted ore residue, admixed with 15 to 30% by weight of flux and 10 to 30% by weight of high alumina substance, for 5 to 10 minutes to blow the slag and oxidize a slight amount of impurities CaS, CaC$_2$ AlN and FeO in the slag; and maintaining the slag at a temperature ranging from 1000 to 700° C. for about 1 hour, after which the slag is cooled naturally and then pulverized by the usual manner.

2. The method as defined in claim 1, wherein the compressed air is under a pressure of 4 kg./cm.$^2$.

References Cited in the file of this patent

UNITED STATES PATENTS

| 486,941 | Rossi | Nov. 29, 1892 |
| 711,059 | Long | Oct. 14, 1902 |
| 1,717,160 | Kichline | June 11, 1929 |
| 2,266,816 | Ruzicka | Dec. 23, 1941 |
| 2,395,029 | Baily | Feb. 19, 1946 |

FOREIGN PATENTS

| 579,762 | Great Britain | Aug. 15, 1946 |